United States Patent
Huang et al.

(10) Patent No.: US 10,962,183 B2
(45) Date of Patent: Mar. 30, 2021

(54) LIGHT-EMITTING DIODE LIGHT BAR, LIGHT SOURCE MODULE AND DISPLAY DEVICE

(71) Applicants: K-TRONICS (SUZHOU) TECHNOLOGY CO., LTD., Jiangsu (CN); BOE TECHNOLOGY GROUP CO., LTD., Beijing (CN)

(72) Inventors: Wei Huang, Beijing (CN); Qingyu Yu, Beijing (CN)

(73) Assignees: K-Tronics (Suzhou) Technology Co., Ltd., Jiangsu (CN); BOE Technology Group Co., Ltd., Beijing (CN)

( * ) Notice: Subject to any disclaimer, the term of this patent is extended or adjusted under 35 U.S.C. 154(b) by 151 days.

(21) Appl. No.: 16/332,108

(22) PCT Filed: Jun. 1, 2018

(86) PCT No.: PCT/CN2018/089437
§ 371 (c)(1),
(2) Date: Mar. 11, 2019

(87) PCT Pub. No.: WO2019/052230
PCT Pub. Date: Mar. 21, 2019

(65) Prior Publication Data
US 2021/0003259 A1    Jan. 7, 2021

(30) Foreign Application Priority Data
Sep. 13, 2017 (CN) .......................... 201721177151.X

(51) Int. Cl.
*F21S 4/28* (2016.01)
*F21V 23/00* (2015.01)
*F21Y 115/10* (2016.01)

(52) U.S. Cl.
CPC .............. *F21S 4/28* (2016.01); *F21V 23/004* (2013.01); *F21Y 2115/10* (2016.08)

(58) Field of Classification Search
CPC ........ F21S 4/28; F21V 23/004; F21Y 2115/10
See application file for complete search history.

(56) References Cited

U.S. PATENT DOCUMENTS

| 7,416,442 B1 * | 8/2008 | Liu ........................ H01R 24/64 |
| | | 439/540.1 |
| 2009/0284481 A1 * | 11/2009 | Zhuang ................... H04M 1/22 |
| | | 345/173 |

(Continued)

FOREIGN PATENT DOCUMENTS

| CN | 1991244 A | 7/2007 |
| CN | 101457906 A | 6/2009 |

(Continued)

OTHER PUBLICATIONS

First Office Action for CN Appl. No. 201721177151.X, dated Feb. 22, 2018.

(Continued)

*Primary Examiner* — Evan P Dzierzynski
(74) *Attorney, Agent, or Firm* — The Webb Law Firm

(57) ABSTRACT

The present disclosure provides an LED light bar, a light source module, and a display device. The LED bar comprises a substrate on which a light source component and an indicator light component are disposed. The light source module comprises the LED light bar. The display device comprises the light source module.

10 Claims, 1 Drawing Sheet

(56) References Cited

U.S. PATENT DOCUMENTS

| | | | | |
|---|---|---|---|---|
| 2015/0177554 A1* | 6/2015 | Li | .................... | G02F 1/133308 |
| | | | | 349/58 |
| 2017/0105265 A1* | 4/2017 | Sadwick | ................ | F21K 9/238 |
| 2017/0368239 A1* | 12/2017 | Askem | ................ | A61M 1/0035 |
| 2018/0184513 A1* | 6/2018 | Arik | .................... | H05K 1/0209 |

FOREIGN PATENT DOCUMENTS

| | | |
|---|---|---|
| CN | 102084324 A | 6/2011 |
| CN | 106534738 A | 3/2017 |
| CN | 107102474 | 8/2017 |
| CN | 207394478 U | 5/2018 |
| JP | 2002-343124 A | 11/2002 |

OTHER PUBLICATIONS

International Search Report and Written Opinion for International Appl. No. PCT/CN2018/089437, dated Sep. 6, 2018.

* cited by examiner

LIGHT-EMITTING DIODE LIGHT BAR, LIGHT SOURCE MODULE AND DISPLAY DEVICE

CROSS-REFERENCE TO RELATED APPLICATIONS

This application is a U.S. National Stage under 35 U.S.C. § 371 of International Application No. PCT/CN2018/089437, filed on Jun. 1, 2018, which claims priority to Chinese Patent Application No. 201721177151.X, filed on Sep. 13, 2017. The disclosures of each of these applications are hereby incorporated herein by reference in their entirety into this application.

TECHNICAL FIELD

The present disclosure relates to an light-emitting diode (LED) light bar, a light source module, and a display device.

BACKGROUND

The indicator lights of the display are used to indicate the operating states of the display. At present, the indicator lights mostly adopt LEDs, and the indicator lights are usually set on the button board or the main board or on a separately set board and fixed under the display, so that the user can view the display status.

SUMMARY

The present disclosure provides an LED light bar comprising a substrate on which a light source component and an indicator light component are disposed.

In one or more embodiments, the light source component is disposed on a first surface of the substrate, and the indicator light component is disposed on a second surface of the substrate. In one or more embodiments, the first surface and the second surface are two surfaces opposite to each other of the substrate.

In one or more embodiments, an interface is disposed on the substrate, at which lines respectively connecting to the light source component and the indicator light component are disposed.

In one or more embodiments, the indicator light component comprises at least two LEDs. In one or more embodiments, the first LED is a blue LED and the second LED is an orange LED.

In one or more embodiments, the indicator light component comprises a first LED for indicating an operating state of a display device and a second LED for indicating a standby state of a display device.

In one or more embodiments, the light source component comprises a plurality of LEDs that provide a light source to a light source module.

The present disclosure also provides a light source module comprising the aforementioned LED light bar.

In one or more embodiments, the light source module further comprises a main board connected to the interface of the LED light bar.

In one or more embodiments, the light source module further a back plate provided with a first through-hole, a plastic frame provided with a second through-hole, and a front frame provided with a third through-hole; wherein the LED light bar is disposed on the back plate, so that the indicator light component is located in the first through-hole, and the first through-hole, the second through-hole and the third through-hole constitute light source output through-holes of the indicator light component.

The present disclosure also provides a display device comprising the foregoing light source module.

In one or more embodiments, the light source module further comprises a transparent light cover comprising a fixed end located between the second through-hole and the third through-hole and an indication end penetrating the third through-hole.

Other features and advantages of the present disclosure will be set forth in the following description, and will be obvious from the description, or be learned by the embodiments of the disclosures. The objects and advantages of the present disclosure can be realized and obtained by the structures specified in the specification, claims and the drawings.

BRIEF DESCRIPTION OF THE DRAWINGS

The drawings provide a further understanding of the technical solutions of the present disclosure and constitute a part of the specification, serve to explain the technical solution of the present disclosure along with the embodiments of the present disclosure, and do not to limit the technical solution of the present disclosure.

DETAILED DESCRIPTION

Embodiments of the present disclosure will be described in detail below with reference to the accompanying drawings. It should be noted that the embodiments in the present disclosure and the features in the embodiments can be arbitrarily combined with each other without conflict.

Figure 1:
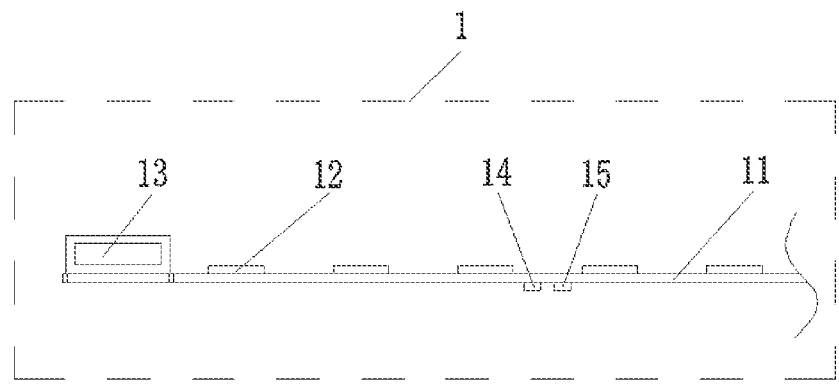
FIG. 1 is a schematic structural view of one or more embodiments of the present disclosure.

As shown in FIG. 1, one or more embodiments of the present disclosure provide an LED light bar 1 comprising a substrate 11 and a light source component and an indicator light component on the substrate 11. That is, the light source component and the indicator light component are collectively located on one substrate 11.

Specifically, since the substrate 11 is provided with both the light source component and the indicator light component, the limitation to the mounting position of the button main board due to the indicator light mounted on the button main board can be avoided, and thus it is possible to provide the button main board at any position, so as to be adapted to the different designs of the appearance of the product. Meanwhile, since the light source component and the indicator light component share one substrate 11, it is possible to avoid an increase in cost due to the additionally provided LED mounting plate, and to avoid an increase in the wiring process for separately providing the indicator light.

In one or more embodiments, the light source component is disposed on the first surface of the substrate 11, and the indicator light component is disposed on the second surface of the substrate 11. That is, the light source component and the indicator light component are disposed on the two surfaces of the substrate 11, respectively. In one or more embodiments, the first surface and the second surface of the substrate 11 can be two surfaces of the substrate 11 opposite to each other. For example, the first surface and the second surface of the substrate 11 can be two surfaces of the substrate 11 that are perpendicular to the thickness direction.

Specifically, the light source component and the indicator light component respectively disposed on the two surfaces of the substrate 11 can achieve a better layout, and can effectively avoid positional interference caused by the simultaneous arrangement of the light source component and the indicator light component on the same surface of the substrate 11. At the same time, the size of the substrate 11 can also be reduced to some extent.

In one or more embodiments, the indicator light component comprises at least two different LEDs. At least two different LEDs aim to correspond to at least two different states of the display device by emitting different lights. For example, the operating state of the display device can be indicated by means of one LED, and the standby state of the display device can be indicated by means of a different LED.

In one or more embodiments, the indicator light component comprises two LEDs. For example, as shown in FIG. 1, the indicator light component comprises a first LED 14 for indicating the operating state of the display device and a second LED 15 for indicating the standby state of the display device. In one or more embodiments, the first LED 14 can employ a blue LED such that when the user finds that the indicator light of the display device emits blue light, which indicates that the display device is in an operating state at this time. In addition, the second LED 15 can adopt an orange LED, so that when the user finds that the indicator light component of the display device emits orange light, which indicates that the display device is in a standby state at this time.

In one or more embodiments, the substrate 11 is provided with an interface 13 at which the lines respectively connecting to the light source component and the indicator light component are disposed. The main board can realize independent control of the light source component and the indicator light component through the interface 13 on the substrate 11.

In one or more embodiments, the light source component comprises a plurality of LEDs that provide a light source to the light source module.

In one or more embodiments, the light source component described above can comprise a plurality of third LEDs 12. The third LEDs 12 can be uniformly disposed on the first surface of the substrate 11 to provide a light source required for the operation of the light source module.

Figure 2:
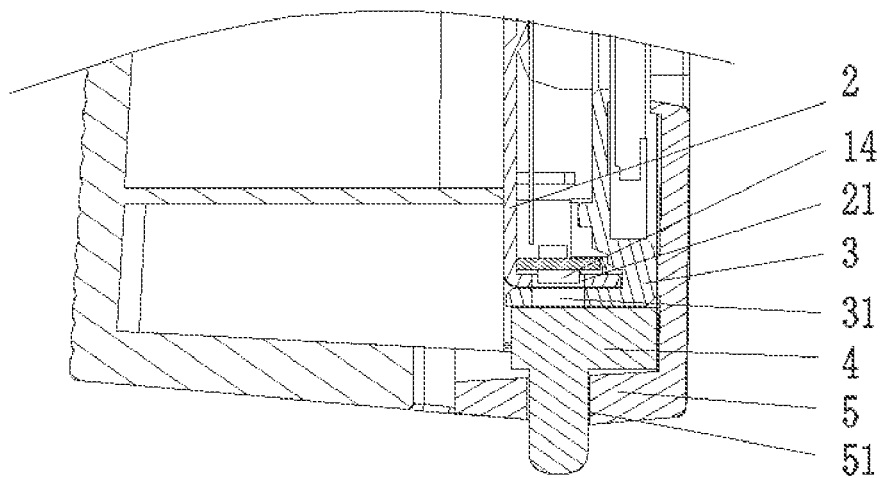
FIG. 2 is a schematic structural view of one or more embodiments of the present disclosure.

As shown in FIG. 2, one or more embodiments of the present disclosure provide a light source module comprising the LED light bar described in the embodiments of the present disclosure.

In one or more embodiments, the light source module can further comprise a main board connect to the interface of the LED light bar. The interface of the LED light bar is provided with lines connected to the light source component and the indicator light component, respectively. After the main board is connected to the LED light bar interface, it can not only provide the power required for the operation of the LED light bar, but also realized the independent controls of the light source component and the indicator light component. Therefore, an independent control of the light source required for the operation of the light source module and an independent control of the state display of the display device can be realized.

When the display device is operating normally, the main board supplies power to the light source component and the indicator light component. At this time, the light source component provides a light source to the light source module, and the indicator light component indicates that the display device is in a working state. When the display device is in standby state, the main board only supplies power to the indicator light component, and the indicator light component indicates that the display device is in the standby state.

In one or more embodiments, the light source module further comprises a back plate 2 provided with a first through-hole 21, a plastic frame 3 provided with a second through-hole 31, and a front frame 5 provided with a third through-hole 51. The LED light bar 1 is disposed on the back plate 2, and the indicator light component is located in the first through-hole 21. The first through-hole 21, the second through-hole 31 and the third through-hole 51 constitute the light source output through-hole of the indicator light component.

In one or more embodiments, the first through-hole 21, the second through-hole 31, and the third through-hole 51 are correspondingly disposed. For example, the first through-hole 21, the second through-hole 31, and the third through-hole 51 can be disposed on the same axis as the light source output through-hole. The light emitted by the above indicator light component can be output through the light source output through-hole, so that the user can determine the current state of the display device through the different lights emitted by the indicator light component. Incidentally, FIG. 2 is a cross-sectional view of the structure of the light source module, and FIG. 2 only shows a specific position of a first LED 14 of the indicator light component. The specific arrangement of the second LED can refer to the arrangement of a first LED 14, i.e., being disposed in the first through-hole 21.

In one or more embodiments, the light source module further comprises a transparent light cover 4 comprising a fixed end located between the second through-hole 31 and the third through-hole 51 and an indication end penetrating through the third through-hole 51.

Specifically, the disposal of the above transparent light cover 4 can achieve normal output of the light of the indicator light component. That is, the light emitted from the indicator light component can be transmitted from the fixed end of the transparent light cover to the indication end of the transparent light cover, to facilitate the viewing of the user. In addition, the transparent light cover 4 can also effectively block external impurities from entering the light source module through the light source output through-hole, which can effectively improve the structural stability inside the light source module.

One or more embodiments of the present disclosure provide a display device comprising the light source module described in the embodiments of the present disclosure. Such display device has all of the features and advantages of a light source module and a LED light bar according to the embodiments of the present disclosure, and the description thereof is omitted here.

In the description of the present disclosure, the terms "set", "connected", "coupled", "fixed", etc., are to be understood broadly. For example, the "connected" can be implemented as a fixed connection, a detachable connection, or an integral connection. Further, "connected" can be implemented as a direct connection, or indirect connection through an intermediary. The specific meanings of the above terms in the present disclosure can be understood by those skilled in the art on a case-by-case basis.

In the description of the present specification, the description of the terms "one embodiment", "a plurality of embodiments", "specific embodiments" and the like means that the specific features, structures, materials or characteristics described in connection with the embodiments or examples are comprised in at least one embodiment or example disclosed in the present disclosure. In the present specification, the schematic representation of the above terms does not necessarily refer to the same embodiment or example. Furthermore, the particular features, structures, materials, or characteristics described can be combined in a suitable manner in any one or more embodiments or examples.

It should be understood by those skilled in the art that, while the embodiments of the present disclosure are as described above, the description is only for the purpose of understanding the embodiments of the present disclosure, and is not intended to limit the embodiments of the present disclosure. Any of those skilled in the art of the embodiment of the present disclosure can made any modifications and changes in form and details of the embodiments of the present disclosure, without departing from the present embodiment from the spirit and scope of the embodiments disclosed, and the protection scope of the embodiments of the present disclosure is still to be determined by the scope of the appended claims.

What is claimed is:

1. A light source module comprising an LED light bar, wherein the LED light bar comprises:
   a substrate on which a light source component and an indicator light component are disposed;
   a back plate provided with a first through-hole;
   a plastic frame provided with a second through-hole; and
   a front frame provided with a third through-hole,
   wherein the LED light bar is disposed on the back plate, so that the indicator light component is located in the first through-hole, and the first through-hole, the second through-hole, and the third through-hole constitute light source output through-holes of the indicator light component, and
   wherein the light source module further comprises a transparent light cover comprising a fixed end located between the second through-hole and the third through-hole and an indication end penetrating the third through-hole.

2. The light source module according to claim 1, wherein the light source component is disposed on a first surface of the substrate, and the indicator light component is disposed on a second surface of the substrate.

3. The light source module according to claim 2, wherein the first surface and the second surface are two surfaces opposite to each other of the substrate.

4. The light source module according to claim 1, wherein an interface is disposed on the substrate, at which lines respectively connecting to the light source component and the indicator light component are disposed.

5. The light source module according to claim 4, further comprising a main board connected to the interface of the LED light bar.

6. The light source module according to claim 1, wherein the indicator light component comprises at least two LEDs.

7. The light source module according to claim 6, wherein the indicator light component comprises a first LED for indicating an operating state of a display device and a second LED for indicating a standby state of a display device.

8. The light source module according to claim 7, wherein the first LED is a blue LED and the second LED is an orange LED.

9. The light source module according to claim 1, wherein the light source component comprises a plurality of LEDs that provide a light source to a light source module.

10. A display device comprising a light source module, wherein the light source module comprises an LED light bar, and the LED light bar comprises:
    a substrate on which a light source component and an indicator light component are disposed;
    a back plate provided with a first through-hole;
    a plastic frame provided with a second through-hole; and
    a front frame provided with a third through-hole,
    wherein the LED light bar is disposed on the back plate, so that the indicator light component is located in the first through-hole, and the first through-hole, the second through-hole, and the third through-hole constitute light source output through-holes of the indicator light component, and
    wherein the light source module further comprises a transparent light cover comprising a fixed end located between the second through-hole and the third through-hole and an indication end penetrating the third through-hole.

* * * * *